United States Patent
Shirodkar et al.

(10) Patent No.: US 12,374,324 B2
(45) Date of Patent: Jul. 29, 2025

(54) TRANSCRIPT TAGGING AND REAL-TIME WHISPER IN INTERACTIVE COMMUNICATIONS

(71) Applicant: Capital One Services, LLC, McLean, VA (US)

(72) Inventors: Anup Shirodkar, Glen Allen, VA (US); Thomas Zahorik, Charlottesville, VA (US); Matthew C. Ford, North Chesterfield, VA (US); Miguel De La Rocha, Richmond, VA (US); Sara R. McDole, Midlothian, VA (US); Robert L. Scholtz, III, Midlothian, VA (US); Raghav Sahai, Plain City, OH (US); Kevin T. Shaffer, North Chesterfield, VA (US); Trent F. Hodges, Richmond, VA (US); Avinash Kawale, Glen Allen, VA (US); David Aber, Winter Garden, FL (US)

(73) Assignee: Capital One Services, LLC, McLean, VA (US)

(*) Notice: Subject to any disclaimer, the term of this patent is extended or adjusted under 35 U.S.C. 154(b) by 206 days.

(21) Appl. No.: 17/964,341

(22) Filed: Oct. 12, 2022

(65) Prior Publication Data
US 2024/0127804 A1    Apr. 18, 2024

(51) Int. Cl.
G10L 15/18     (2013.01)
G06F 40/117    (2020.01)
G06F 40/284    (2020.01)
G06F 40/30     (2020.01)
G10L 15/22     (2006.01)

(52) U.S. Cl.
CPC ........ *G10L 15/1807* (2013.01); *G06F 40/117* (2020.01); *G06F 40/284* (2020.01); *G06F 40/30* (2020.01); *G10L 15/22* (2013.01)

(58) Field of Classification Search
CPC ... G10L 15/1807; G10L 15/22; G06F 40/284; G06F 40/30; G06F 40/117
See application file for complete search history.

(56) References Cited

U.S. PATENT DOCUMENTS 10,311,454 B2   6/2019   McCord
10,623,451 B2   4/2020   Rathod
(Continued)

FOREIGN PATENT DOCUMENTS

CA   3058928 A1 * 10/2018  ............. G06F 3/167
CA   3032693 A1 *  8/2019  ......... G06Q 30/0201
(Continued)

*Primary Examiner* — Paras D Shah
*Assistant Examiner* — Oluwadamilola M Ogunbiyi
(74) *Attorney, Agent, or Firm* — Sterne, Kessler, Goldstein & Fox P.L.L.C.

(57) ABSTRACT

Disclosed herein are system, method, and computer readable medium embodiments for machine learning systems to process interactive communications between at least two participants. Speech and text within the interactive communications are analyzed using machine learning models to infer insights located within the interactive communications. The inferred insights are converted to descriptive text or audio and tagged to the interactive communication as graphics or audio whispers reflecting the insights added to the interactive communication.

12 Claims, 8 Drawing Sheets

(56) References Cited

U.S. PATENT DOCUMENTS

| | | | |
|---|---|---|---|
| 10,645,224 B2 | 5/2020 | Dwyer et al. | |
| 10,938,867 B2 | 3/2021 | Deole et al. | |
| 11,134,153 B2 | 9/2021 | Megann et al. | |
| 11,170,336 B2 | 11/2021 | Kaimal et al. | |
| 11,699,113 B1* | 7/2023 | Pearson | G06V 20/41 |
| | | | 707/609 |
| 2006/0059120 A1* | 3/2006 | Xiong | G06F 16/7834 |
| 2009/0129565 A1* | 5/2009 | Hyndman | H04M 3/568 |
| | | | 379/87 |
| 2015/0024800 A1* | 1/2015 | Rodriguez | H04M 1/72403 |
| | | | 455/556.1 |
| 2017/0169840 A1* | 6/2017 | Rubin | G10L 15/26 |
| 2019/0325068 A1* | 10/2019 | Lai | G06F 16/951 |
| 2019/0341050 A1* | 11/2019 | Diamant | G06V 40/172 |
| 2020/0184307 A1* | 6/2020 | Lipka | G06N 3/02 |
| 2020/0202268 A1* | 6/2020 | Retna | G06N 20/00 |
| 2020/0380978 A1* | 12/2020 | Ahn | G06F 3/167 |
| 2021/0004836 A1 | 1/2021 | Adibi et al. | |
| 2021/0152880 A1* | 5/2021 | Marten | H04N 21/4394 |
| 2021/0157834 A1* | 5/2021 | Sivasubramanian | G06F 16/686 |
| 2021/0158813 A1* | 5/2021 | Sivasubramanian | G06Q 10/107 |
| 2021/0326472 A1* | 10/2021 | Shelepov | G06F 21/6245 |
| 2022/0076424 A1* | 3/2022 | Shin | G06V 40/161 |
| 2022/0108698 A1* | 4/2022 | Moritz | G05B 23/024 |
| 2022/0229994 A1* | 7/2022 | Sharma | H04L 51/02 |
| 2022/0238103 A1* | 7/2022 | Madhusudhan | G10L 15/1815 |
| 2023/0035155 A1* | 2/2023 | Huang | H04N 7/147 |
| 2023/0052123 A1* | 2/2023 | Anaokar | H04L 12/1859 |
| 2023/0066100 A1* | 3/2023 | Cherukara | G10L 15/22 |
| 2023/0367968 A1* | 11/2023 | Eisenstadt | G06N 3/045 |
| 2023/0376970 A1* | 11/2023 | Henryson | G06F 40/166 |
| 2024/0087547 A1* | 3/2024 | Ivers | G10H 1/0008 |
| 2024/0193069 A1* | 6/2024 | Kikuchi | G06N 3/0464 |

FOREIGN PATENT DOCUMENTS

| | | | | |
|---|---|---|---|---|
| DE | 112020002288 T5 * | 2/2022 | | G10L 13/027 |
| WO | WO-2022081930 A1 * | 4/2022 | | G06Q 20/4016 |

* cited by examiner

700

[00:00:01] Channel 1: [noise]
[00:00:06] Channel 2: thank you so much for calling capital one my name is :n: <unk> may i have your first and your last name please
[00:00:07] Channel 1: okay
[00:00:12] Channel 1: :n: <unk>
[00:00:14] Channel 2: thanks so much for that information ms <unk> and tell me how may i help you today ma'am
[00:00:18] Channel 1: um well I haven't been able to find my card for a while if you look on the account i haven't made any transaction probably in close to a year i have no idea where my credit card is Tag 1: Greeting: success — 704, 706

Tag 2: Call Type: Lost Card 710 — 708

Tag 3: Emotion: caller getting frustrated 712 — 714

TRANSCRIPT TAGGING AND REAL-TIME WHISPER IN INTERACTIVE COMMUNICATIONS

BACKGROUND

Text and speech may be analyzed by computers to discover words and sentences. However, missing in current computer-based text/speech analyzers is an ability to properly capture insights—that is, conclusions and analyses based on such words and sentences.

BRIEF DESCRIPTION OF THE DRAWINGS

The accompanying drawings are incorporated herein and form a part of the specification.

FIG. 7 is a diagram illustrating tagging a transcript of an interactive communication, according to some embodiments.

In the drawings, like reference numbers generally indicate identical or similar elements. Additionally, generally, the left-most digit(s) of a reference number identifies the drawing in which the reference number first appears.

DETAILED DESCRIPTION

Figure 1:
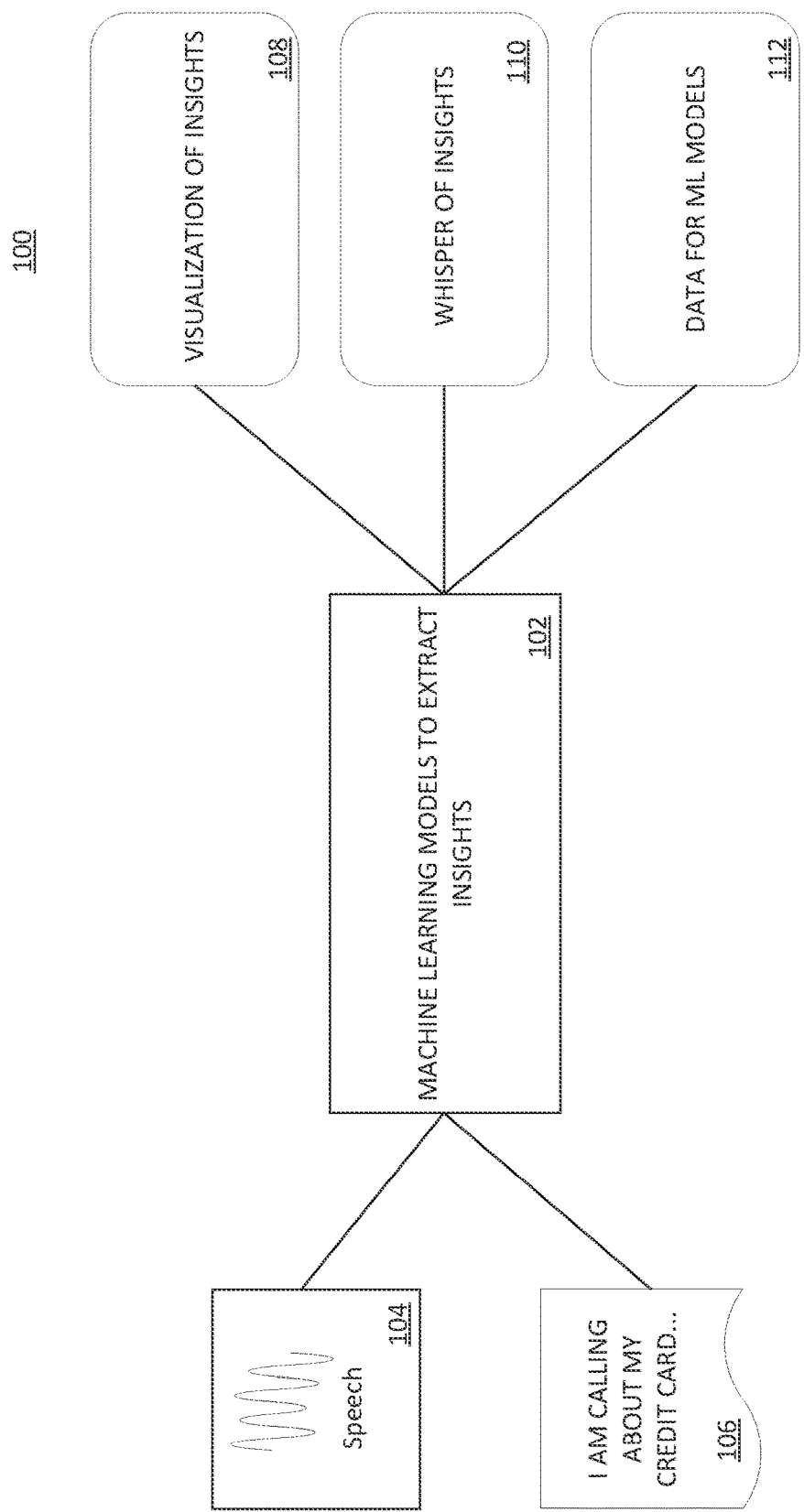
FIG. 1 is a block diagram for extracting insights from an interactive communication, according to some embodiments.

Provided herein are system, apparatus, device, method and/or computer readable medium embodiments, and/or combinations and sub-combinations thereof to tag inferred insights, in real-time, to an interactive communication.

In some embodiments, the technology disclosed herein tags audio of an interactive communication, in real-time, with insights derived from a machine learning analysis of the interactive communication. These insights may be derived from an analysis of either an audio version of the interactive communication, a textual version (e.g., transcript), or both.

In some embodiments, the technology disclosed herein implements a system where audio, representing a description of a derived insight, may be overlaid as a whisper (low volume) voice on the original interactive communication at points (e.g., sections) tagged (e.g., in time) by the communications system.

While described herein as processing the audio or transcript to generate insights, insights derived from other sources, for example, manually tagged insights (e.g., quality issues) may be overlaid onto the audio or transcript using the technology described herein.

In some embodiments, the technology disclosed herein provides a framework that utilizes machine learning (ML) models to extract insights from caller-call agent interactions. These systems may process prosodic cues, such as when a customer raises their voice, semantic cues, including sentiments of the words or complaints, as well as linguistic cues, such as detecting key phrases indicative of subject matter, such as a reason for call or regulatory compliance, to name a few. In one non-limiting example, vocalized stress on certain words may indicate a higher emphasis on these words. In another non-limiting example, an increase in volume or pitch may indicate a change in emotions and an inclination towards anger/frustration. In some embodiments, these extracted cues may be able to paint a more complete picture of a customer's experience during a call to a call center that may be used to increase overall customer satisfaction. In some embodiments, audio or transcripts modified by tagged insight descriptions may be provided to downstream users, including call agents/managers in the call centers as well as to machine learning models built in pipelines of modeling customer conversations. In some embodiments, the tags on the voice or transcripts may be used to segment and group high risk calls, which can be later used for trend detection and prediction. In some embodiments, the tags may be used to create a repository of golden calls (e.g., high quality, important or successful, etc.) that could be used for agent training to showcase good calls. In some embodiments, tagged calls may be used to listen to calls for product intent ideas. For example, call center staff may have a personal set of tags and subsequently create a personal library of calls they may use for examples, brainstorming, training, etc.

Real-time assistance is key to providing the best support to agents. In various embodiments, audio or text overlays of insights may be implemented while a call is in progress in order to improve customer interaction in real time. In some embodiments, overlays are provided post call for call agent training or to enhance repeat customer calls. For example, during a previous call, a cue reflecting anger was extracted. This information may prove useful to train a call agent to understand the customer's previous emotional state and what additional insights were present that led to a successful or unsuccessful call resolution.

The technology described herein improves the technology associated with handling calls by, at a minimum, properly extracting caller insights and subsequently tagging call audio and text with these insights. The technology described herein allows insights captured in a disparate medium (e.g., audio vs. text) to be retained in the original medium. Capturing and tagging insights derived from both the audio and transcript of an interactive communication improves each of the audio and transcript information. Properly captured insights, as described herein, are one element leading to higher correlated solutions. As such, the technology described herein improves how a computer identifies and captures a call insight, thereby improving the operation of the computer system (e.g., call center system) itself.

In some embodiments, the insights will be mixed (e.g., whisper voice) into the original audio to assist call agents or managers to facilitate their work (e.g., repeat calls with same customer, training opportunities) and to save time.

In some embodiments, the insights will be visualized to assist call agents or managers to facilitate their work (e.g., repeat calls with same customer, training opportunities) and to save time.

Throughout the descriptions, the terms "audio" and "speech" may be interchangeably used. In addition, throughout the descriptions, the terms "text" and "transcript" may be interchangeably used.

FIG. 1 is a block diagram for extracting insights from an interactive communication, according to some embodiments. The insights may be considered, in some embodiments, to be hidden or not explicitly revealed. System 100 may be implemented by hardware (e.g., switching logic, communications hardware, communications circuitry, computer processing devices, microprocessors, dedicated logic, programmable logic, microcode, etc.), software (e.g., instructions executing on a processing device), or a combination thereof. It is to be appreciated that not all components may be needed to perform the disclosure provided herein. Further, some of the processes described may be performed simultaneously, or in a different order or arrangement than shown in FIG. 1, as will be understood by a person of ordinary skill in the art.

System 100 shall be described with reference to FIG. 1. However, system 100 is not limited to this example embodiment. In addition, system 100 will be described at a high level to provide an overall understanding of one example call flow from incoming call to tagged outputs (e.g., audio or text). Greater detail will be provided in the figures that follow.

Figure 4:
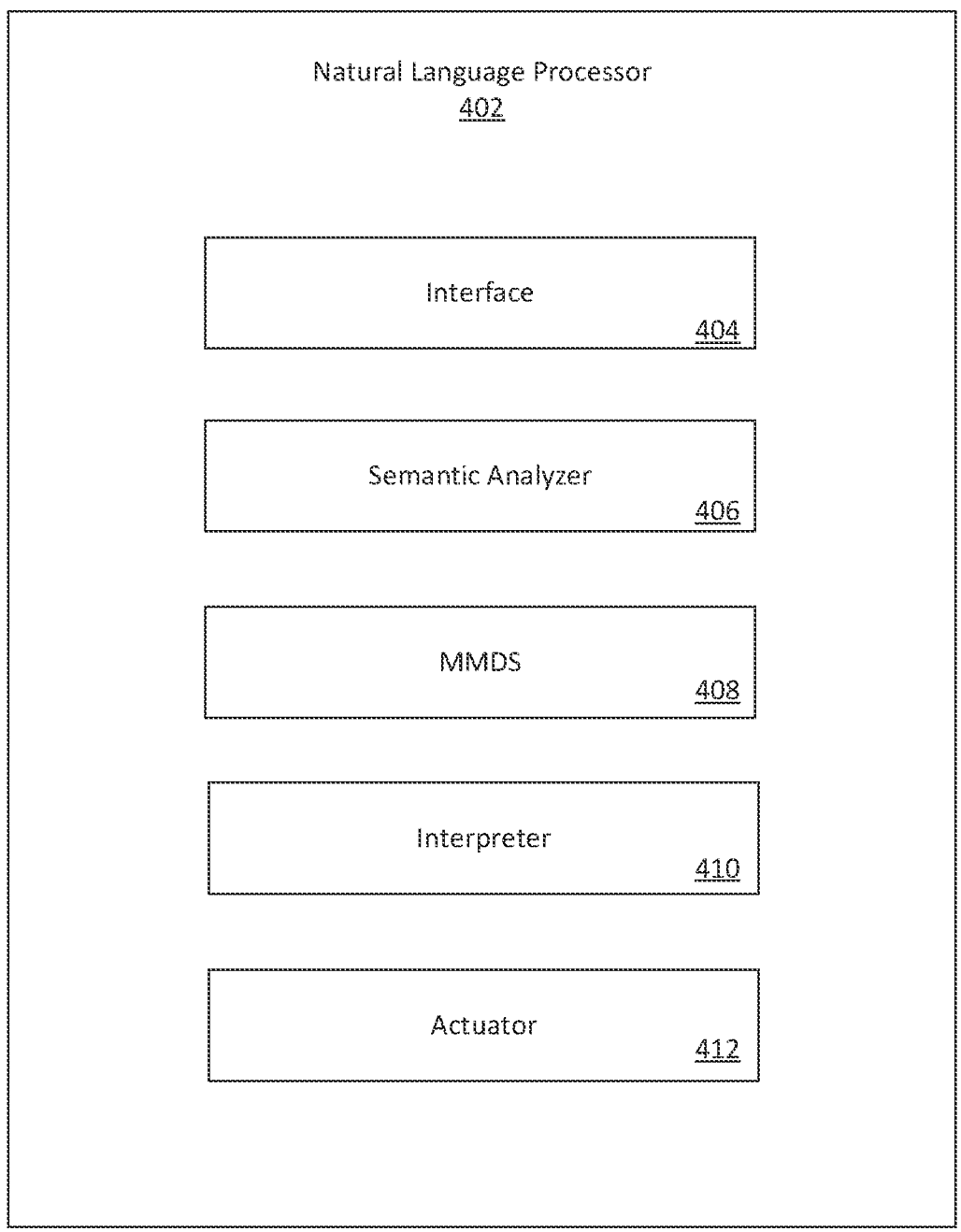
FIG. 4 is a block diagram illustrating a Natural Language Processor (NLP), according to some embodiments.

As shown, speech 104 from an incoming call may be analyzed by a natural language processor (NLP), as described in greater detail in FIG. 4. The natural language processor may break down a series of utterances to determine the "parts" of speech occurring during the interactive communication (call). One or more machine learning models 102 receive the analyzed speech to extract conversational cues. These cues include, but are not limited to, volume, pitch, rate, pauses, stress, sentiment, emotions, etc. These machine learning models will subsequently analyze these cues to infer insights about one or more parts of the call. In one non-limiting example, a user raising their voice, where the audio cue is a sharp positive volume change, may be classified by the machine learning model as an insight reflecting that the caller is angry or is becoming angry.

Text, such as a transcript 106 of a call, may also be analyzed by a natural language processor (NLP) as described in greater detail in FIG. 4. The natural language processor will break down the script into a series of words or sentences and reveal their semantic structure. One or more machine learning models 102 may receive the analyzed script to extract conversational cues, such as, key words, potential subjects, themes or sentiment cues. These machine learning models will analyze these cues to infer insights about one or more parts of the call. In one non-limiting example, key words, such as "lost credit card," may be classified by the machine learning model as an insight reflecting a "reason for the call".

An output 108 of system 100 may include a transcript of a call with visualization of insights tagged relative to when they occur in the transcript. In a non-limiting example, visualization may include graphical overlays with descriptions of the insight. These visualizations may be provided to call agents or call center managers for quick reading, during a call, for a next call by a same caller to quickly get up to speed on the last interaction, or later for training purposes. These visualizations assist a user when browsing through content of the transcript.

Another output 110 of system 100 may include an audio recording (e.g., speech) of a call with audio overlays of insights tagged relative to when they occur in the call. In a non-limiting example, audio overlays may include whisper voice overlays with descriptions of the insight. These audio overlays may be provided to call agents or call center managers for quick listening, either during a call, for a next call by a same caller to quickly get up to speed on the last interaction, or later training purposes.

In some embodiments, insights will be derived at or near the end of a respective audio or text section that generates the insight. However, for a better future review, the tag may be added to any point in the audio or transcript that will facilitate a quicker understanding of the call. In a non-limiting example, the insights may be tagged right before the words that generate the insight, at the end of these words, anywhere in-between or at the beginning or end of a complete call record. When the reviewer of the call is attempting a quick review to understand the situation, they only need to focus on the insights. For example, it is possible to understand quickly that the customer is having a problem with their credit card based on a corresponding insight. In one embodiment, the reviewer could simply review each of the tagged insights to understand the entire call.

In some embodiments, the insights may be used for downstream ML models to increase the models' effectiveness in understanding customer behavior. For example, the insights may be used for weighting of related call center ML models 112, such as using insights as weighted features for a ML, model to determine if a customer is calling about a complaint.

Figure 2:
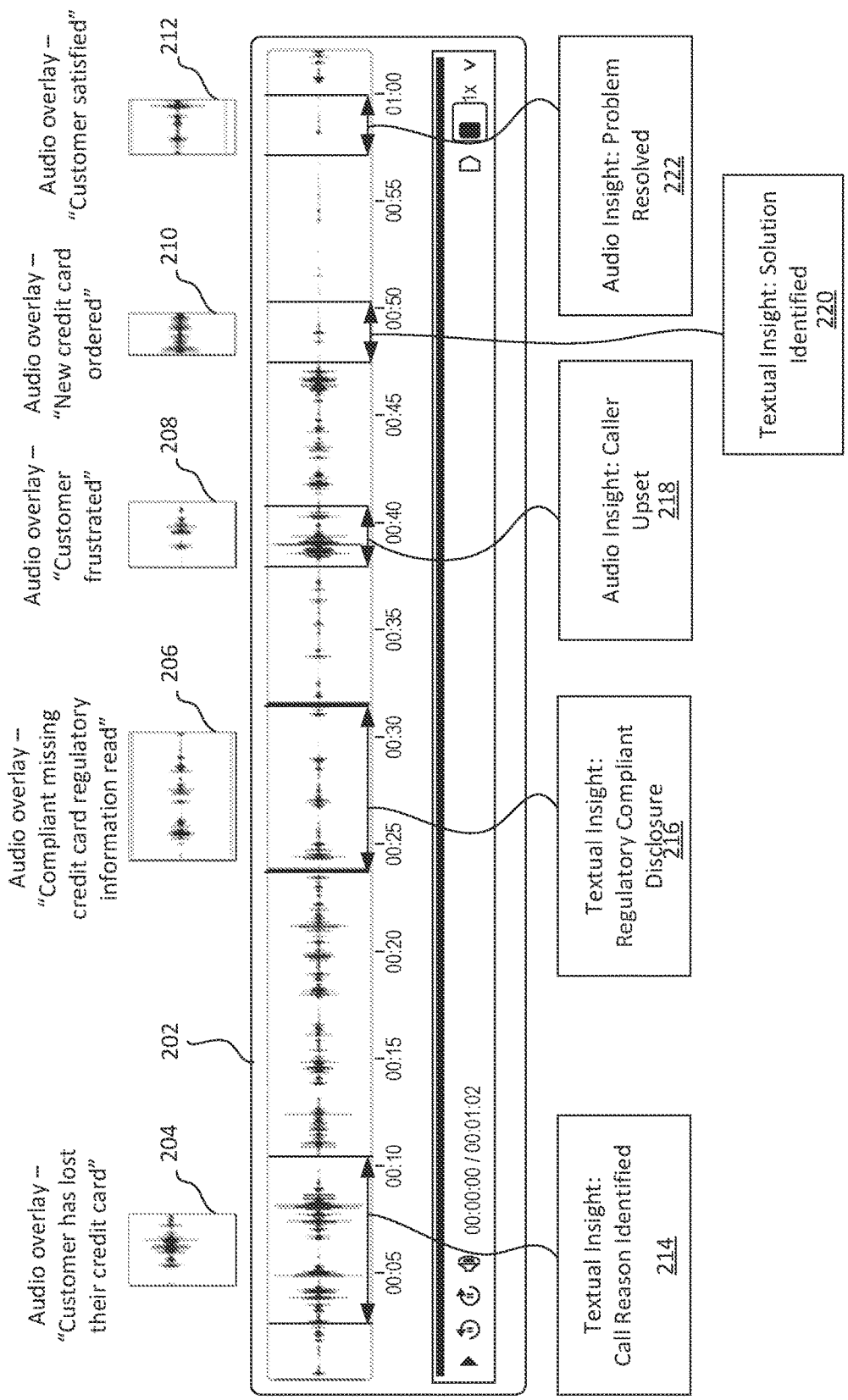
FIG. 2 is a diagram illustrating tagging audio of an interactive communication, according to some embodiments.

FIG. 2 is a diagram illustrating tagging audio of an interactive communication 200, according to some embodiments. As shown, original audio 202 of an incoming call is modified to include insights 204-212 overlaid onto the original audio 202 as voice overlays. As a reviewer of the original audio 202 listens to the call, the various insights will be read as a voiceover simultaneously with the original audio 202. For example, a whisper voice (lower volume) may be overlaid at various points in the original audio where respective insights occur.

As previously described, insights may be derived from audio or textual versions of the call record. In one non-limiting example, for a time period occurring early in the call (i.e., 3-11 seconds), a "call reason" is identified as a textual insight 214 derived from this time period. The call reason may be derived at any point in this time period when enough information is available to reach a classification level that confidently identifies this call reason. For example, the machine learning model classifies a specific call reason when reaching a confidence threshold of 80% or higher. Audio 204 describes this insight as "customer has lost their credit card" and is overlaid onto the original audio 202 at or around this point (i.e., proximate) in the original audio 202 recording.

In one non-limiting example, for a time period occurring from 24-32 seconds, a machine learning model identifies a textual insight that a regulatory compliant disclosure was read by the call agent by comparing words read against words that are part of specific regulatory disclosures. Regulatory compliant disclosures may require that all words be read in the correct order or any variation of this requirement. For example, some words may be deemed equivalent or not absolutely necessary. In one non-limiting example, the machine learning model classifies a regulatory compliant disclosure as read when reaching a threshold of 95% or higher. The specific disclosure required may be inferred from the earlier derived insight that a customer has lost their credit card. Audio 206 describes this insight as "compliant missing credit card regulatory information read" and is overlaid onto the original audio 202 at or around this point in the original audio 202 recording.

In one non-limiting example, for a time period occurring from 38-41 seconds, a machine learning model identifies an audio insight 218 that a negative emotion has been identified. Audio 208 describes this insight as "customer frustrated" and is overlaid onto the original audio 202 at or around this point in the original audio 202 recording.

In one non-limiting example, for a time period occurring from 48-51 seconds, a machine learning model identifies a textual insight 220 that a solution to the call reason has been identified. Audio 210 describes this insight as "new card credit card ordered" and is overlaid onto the original audio 202 at or around this point in the original audio 202 recording.

In one non-limiting example, for a time period occurring from 57-60 seconds, a machine learning model identifies an audio insight 222 that a the problem has been resolved. For example, as shown, during this time period, the voice level is recorded at a level much lower than the typical conversation levels found in the original audio 202. Audio 212 describes this insight as "customer satisfied" and is overlaid onto the original audio 202 at or around this point in the original audio 202 recording.

In the above example, the original audio 202 has been modified to include insights 208 and 212 derived from audio cues found within the original audio 202 recording. At the same time, the original audio 202 has been modified to include insights 204, 206, and 210 derived from textual cues (e.g., key words) found within a transcript of the original audio 202 recording.

Figure 3:
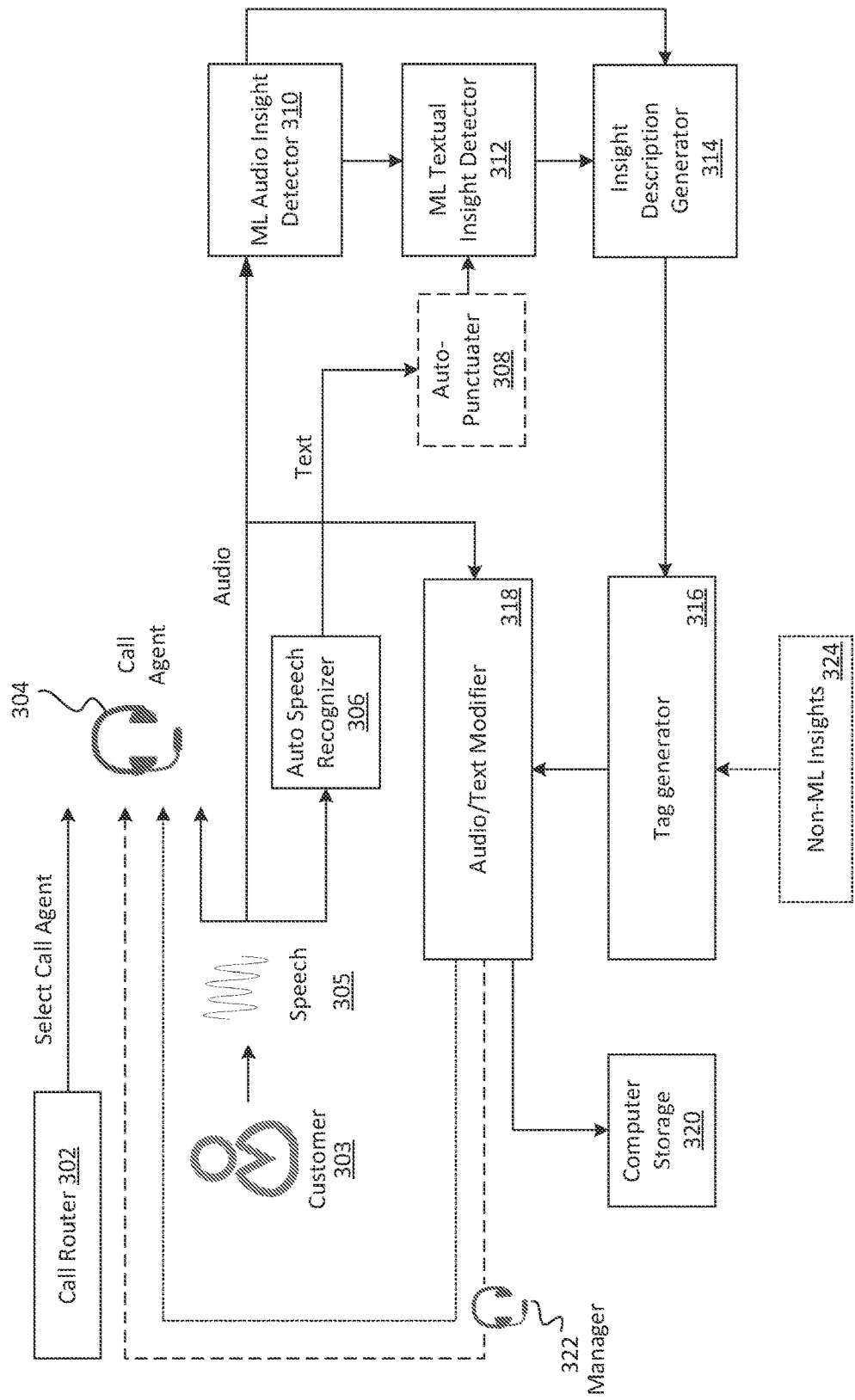
FIG. 3 is a block diagram illustrating processing of an incoming call, according to some embodiments.

FIG. 3 illustrates an example call center system 300 processing an incoming interactive communication such as a customer 303 call, as per some embodiments. System 300 can be implemented by hardware (e.g., switching logic, communications hardware, communications circuitry, computer processing devices, microprocessors, dedicated logic, programmable logic, microcode, etc.), software (e.g., instructions executing on a processing device), or a combination thereof. It is to be appreciated that not all components may be needed to perform the disclosure provided herein. Further, some of the processes described may be performed simultaneously, or in a different order or arrangement than shown in FIG. 3, as will be understood by a person of ordinary skill in the art.

Call center system 300 shall be described with reference to FIG. 3. However, call center system 300 is not limited to this example embodiment. In addition, call center system 300 will be described at a high level to provide an overall understanding of one example call flow from incoming call to augmenting speech/transcripts with insights of the call. Greater detail will be provided in the figures that follow.

Call center calls are routed to a call agent 304 through a call router 302. Call router 302 may analyze pre-call information, such as a caller's profile, previous call interactions, voice menu selections or inputs to automated voice prompts. Call agents may be segmented into groups by subject matter expertise, such as experience with specific subjects or subject matter customer complaints. Understanding which call agent to route the incoming call to may ultimately determine a successful outcome, reduce call time and enhance a customer's experience. In an embodiment, the call agent may be chatbot(s) or other an equivalent communication entity.

Once a call agent 304 is selected, automatic speech recognition (ASR) engine 306 may analyze the incoming caller's 303 (e.g., customer) speech 305 in real time by sequentially analyzing utterances. Utterances may include a spoken word, statement, or vocal sound. However, utterances may be difficult to analyze without a proper understanding of how, for example, one utterance relates to another utterance. Languages follow known constructs (e.g., semantics), patterns, rules and structures as is known. Therefore, these utterances may be analyzed using a systematic approach as will be discussed in greater detail hereafter.

Call centers receive hundreds of thousands of calls daily. These calls may be transcribed from speech recordings to text using automatic speech recognition (ASR) engine 306. The ASR's output is a sequence of words that begin when the caller begins speaking (e.g., utterances) and ends only once there is a significant duration of silence or the call ends. This text may therefore contain many sentences with no visible boundaries between them and no punctuation. Additionally, given the spontaneous nature of spoken language, the text frequently contains disfluencies, for example, filler words, false starts, incomplete phrases, and other hallmarks of unrehearsed speech. These disfluencies are not marked, and are interleaved with the rest of the speech. This further obscures the meaningful portions of the text. The lack of punctuation and boundaries in the ASR system's output causes difficulty for humans or computers analyzing, reading, or processing the text output, and causes problems for downstream models, which benefit from clearly delineated syntactic boundaries in the text. One way to increase an understanding of utterances is to aggregate one or more utterances into related structures (segments). In some embodiments, ASR may convert call audio to text for the downstream analyses described in the following sections.

Optional auto-punctuator 308 may, in some embodiments, add punctuation to segments of utterances, thus grouping them into sentences, partial sentences or phrases. For example, the sequential utterances " . . . problem with my credit card . . . " may have two different meanings based on punctuation. In the first scenario, punctuation after the word credit ("problem with my credit. Card . . . ") would indicate a credit issue. In a second scenario, punctuation after the word card ("problem with my credit card") would indicate a credit card issue. Therefore, intelligent punctuation may suggest to the call center system 300 contextual relevancy needed to properly address caller issues.

Continuing with the example, in one embodiment, assuming that the input into the call center system 300 is a customer's speech 305 to be converted to text, the call center system 300 may begin performing its functions by generating text strings to obtain a representation of the meaning of each word in the context of the speech string. The text string refers to a sequence of words that are unstructured (e.g., may not be in sentence form and contain no punctuation marks).

Based on the transcription and the spontaneous nature of spoken language, the text string likely contains errors or is incomplete. The errors may include, for example, incorrect words, filler words, false starts to words, incomplete phrases, muted or indistinguishable words, or a combination thereof, that make the text string unreadable or difficult to understand by a human or computer.

In one embodiment, the text string may be received directly from the ASR system 306. In another embodiment, the text string may be stored and later retrieved from computer storage 320, such as, a repository, database, or computer file that contains the text string. For example, in one embodiment, the text string may be generated by the ASR and saved to a repository, database, or computer file, such as a .txt file or Microsoft Word™ file, as examples, for subsequent retrieval. In either case (ASR vs file), the optional auto-punctuator 308 and Machine Learning (ML) Textual Insight Detector 310 receive an ASR output.

In one embodiment, the text string may be converted from text or character format into a numerical format. In one embodiment, the conversion may be performed by converting each word of the text string into one or more tokens by a semantic analyzer 406 (see FIG. 4). The one or more tokens refer to a sequence of real values that represent and map to each word of the text string. The one or more tokens allow each word of the text string to be numerically quantified so that computations may be performed on them, with the ultimate goal being to generate one or more contextualized vectors. The contextualized vectors refer to vectors that encode the contextualized meaning (e.g., contextualized word embeddings) of each of the tokens into a vector representation. The contextualized vectors are generated through the processes and methods used in language models such as the BERT (Bidirectional Encoder Representations from Transformers) and RoBERTa (Robustly Optimized BERT Pretraining Approach) language models. For the purposes of discussion throughout this application, it is assumed that the contextualized vectors are generated based on such processes and methods. However, one skilled in the art will recognize that other approaches of recognizing context may be substituted without departing from the scope of the technology described herein.

Continuing with the example, the one or more tokens may be generated based on a variety of criteria or schemes that may be used to convert characters or text to numerical values. For example, in one embodiment, each word of a text string can be mapped to a vector of real values. The word may then be converted to one or more tokens based on a mapping of the word via a tokenization process. Tokenization processes are known in the art and will not be further discussed in detail here.

In one embodiment, the formatted text string may further be transmitted for display or may be transmitted to a repository, database, or computer file, such as a .txt file or Microsoft Word™ file, as examples, to be saved for further retrieval by a user or components of the system 300.

ML Audio Insight Detector 310 is a speech classifier to evaluate an interactive communication (incoming call) between a first participant and a second participant to obtain one or more inferred audio insights from speech 305. As later described in FIG. 5, in one-non-limiting example, machine learning engine 502 trains a prosodic cue model 522 to detect when a customer's emotions are changing. One or more inferred changes to emotion of the speech may be based at least on prosodic cues within the interactive communication. The prosodic cues may comprise any of: frequency changes, pitch, pauses, length of sounds, volume (e.g., loudness), speech rate, voice quality or stress placed on a specific utterance of the speech of the first participant and/or second participant. Other audio-based ML models that derive audio insights are considered within the scope of the technology described herein.

ML Textual Insight Detector 312 is a text classifier to evaluate a transcript of an interactive communication (e.g., incoming call) between a first participant and a second participant to infer one or more textual insights. As later described in FIG. 5, in one-non-limiting example, machine learning engine 502 trains a sentiment predictive model 526. Sentiment predictive model 526 is a semantic classifier to evaluate a transcript of an interactive communication to infer one or more insights based on sentiments detected. While text semantics may be analyzed to determine sentiments, alternatively, or in addition to, speech cues may also be analyzed to determine semantics that may capture or enhance an understanding of the sentiments of the caller. Therefore, sentiment predictive model 526 may receive as inputs text as well as speech cues from prosodic cue model 522. For example, a person who is shouting (i.e., prosodic cue) may add context to semantics of a discussion found in the transcript text. Using acoustic features in accordance with aspect-based sentiment analysis is a more targeted approach to sentiment analysis, identifying both emotion and their objects (products, services, etc.). Therefore, the inferred sentiments of the speech of a participant may be based at least partially on semantic cues within the interactive communication (e.g., call). As later described in FIG. 5, machine learning engine 502 trains a sentiment predictive model 526 to detect when a customer's emotional state is changing (e.g., they are becoming angry or dissatisfied).

Insight description generator 314 receives the insights and generates an audio description (e.g., spoken words), a textual description (e.g., written words) or both. For example, an audio insight of a "negative emotion" may generate a corresponding description of "the caller is becoming agitated" or "the caller is becoming angry" depending on the degree of the negative emotion. For example, a caller raising their voice (i.e., prosodic cue) may generate the first description, where a caller shouting may generate the second description.

Tag generator 316 recognizes a time or place in a call record where insights occur and tags (i.e., attaches) insight descriptions at or near (e.g., proximate) this time or place. These tags may be indexed to a specific call record and be later retrieved with the call record (audio or text). In some embodiments, insights will be derived at or near the end of a respective audio or text section that generates the insight. However, for a better future review, the tag may be added to any point in the audio or transcript that will facilitate a quicker understanding of the call. In a non-limiting example, the insights may be tagged right before the words that generate the insight, at the end of these words, anywhere in-between or at the beginning or end of a complete call record.

In some embodiments, multiple indexes may be created to recognize variations in placement of the tags. In a first non-limiting example, a first index file may be generated that places all tags proximate to where they occur. In a second non-limiting example, a second index file of the same call record may distribute the tags according to another approach, for example, all tags placed at the beginning or end of the call record as a summary of the call record. In a third non-limiting example, a third index file of the same call record may distribute the tags immediately before the words that generate the insight to provide a preview of what follows.

Audio/Text Modifier 318 modifies the audio or text of a call record to add the insight descriptions at the tagged locations. In some embodiments, the technology disclosed herein implements a system where audio, representing a description of a derived insight, may be overlaid as a whisper (low volume) voice on the original interactive communication at points tagged (e.g., in time) by the communications system. In some embodiments, the technology disclosed herein implements a system where text representing a description of a derived insight may be overlaid as a graphic on the original interactive communication at points tagged (e.g., in time) by the communications system. The modified audio or text is provided, in real-time, to a manger 322 or call agent 304 for their consideration. Alternately, or in combination, the modified audio is stored in computer storage 320. In some embodiments, the audio, text, insights, insight descriptions, indexes, tags and modified audio or text may be stored as separate files or as a single file. For example, a modified call record may be generated, ad hoc, by retrieving the audio and placing the insight descriptions at the indexed tag locations. In this way, a call record could be selectively modified by selecting specific insights or specific tagging approaches.

Therefore, the technology described herein solves one or more technical problems that exist in the realm of online computer systems. One problem, proper identification of a call insights in audio and textual transcriptions, prevents other systems from properly correlating insights derived from alternate mediums (i.e., audio vs. text) into corresponding caller solutions. The technology as described herein provides an improvement in properly identifying insights associated with a call record using a real-time ML system that increases a likelihood of a correlation with a real-time solution (e.g., in the automated system assistance) and subsequent successful outcome of the call. Therefore, one or more solutions described herein are necessarily rooted in computer technology in order to overcome the problem specifically arising in the realm of computer networks. The technology described herein reduces or eliminates this problem of an inability for a computer to properly capture and present to a user a correct audio or textual insights from a common call record as will be described in the various embodiments of FIGS. 1-7.

In some embodiments, the technology described herein, the audio and textual insight detector models predict insights continuously as the call is transcribed. This generates real-time insights as the call progresses.

While described herein as processing the audio or transcript to generate insights, insights derived from other sources, for example, manually tagged insights 324 (e.g., quality issues) may be overlaid onto the audio or transcript using the technology described herein.

FIG. 4 is a block diagram of a Natural Language Processor (NLP) system 400, according to some embodiments. The number of components in system 400 is not limited to what is shown and other variations in the number of arrangements of components are possible, consistent with some embodiments disclosed herein. The components of FIG. 4 may be implemented through hardware, software, and/or firmware. As used herein, the term non-recurrent neural networks, which includes transformer networks, may refer to machine learning processes and neural network architectures designed to handle ordered sequences of data for various natural language processing (NLP) tasks. NLP tasks may include, for example, text translation, text summarization, text generation, sentence analysis and completion, determination of punctuation, or similar NLP tasks performed by computers.

As illustrated, system 400 may comprise a Natural Language Processor (NLP) 402. NLP 402 may include any device, mechanism, system, network, and/or compilation of instructions for performing natural language recognition of caller emotions, key phrases and sentiment, consistent with the technology described herein. In the configuration illustrated in FIG. 4, NLP 402 may include an interface 404, a semantic analyzer 406, a Master and Metadata Search (MMDS) 408, an interpreter 410, and/or an actuator 412. In certain embodiments, components 404, 406, 408, 410, and/or 412 may each be implemented via any combination of hardware, software, and/or firmware.

Interface 404 may serve as an entry point or user interface through which one or more utterances, such as spoken words/sentences (speech), may be entered for subsequent recognition using an automatic speech recognition model 524. While described for spoken words throughout the application, text may also be analyzed and processed using the technology described herein. For example, a pop-up chat session may be substituted for spoken words. In another embodiment, text from emails may be substituted for spoken words. In yet another embodiment, spoken words converted to text or text converted to spoken words, such as for blind or deaf callers, may be substituted without departing from the scope of the technology described herein.

In certain embodiments, interface 404 may facilitate information exchange among and between NLP 402 and one or more users (callers) and/or systems. Interface 404 may be implemented by one or more software, hardware, and/or firmware components. Interface 404 may include one or more logical components, processes, algorithms, systems, applications, and/or networks. Certain functions embodied by interface 404 may be implemented by, for example, HTML, HTML with JavaScript, C/C++, Java, etc. Interface 404 may include or be coupled to one or more data ports for transmitting and receiving data from one or more components coupled to NLP 402. Interface 404 may include or be coupled to one or more user interfaces (e.g., a speaker, microphone, headset, or GUI).

In certain configurations, interface 404 may interact with one or more applications running on one or more computer systems. Interface 404 may, for example, embed functionality associated with components of NLP 402 into applications running on a computer system. In one example, interface 404 may embed NLP 402 functionality into a Web browser or interactive menu application with which a user (call agent) interacts. For instance, interface 404 may embed GUI elements (e.g., dialog boxes, input fields, textual messages, etc.) associated with NLP 402 functionality in an application with which a user interacts. Details of applications with which interface 404 may interact are discussed in connection with FIGS. 1-7.

In certain embodiments, interface 404 may include, be coupled to, and/or integrate one or more systems and/or applications, such as speech recognition facilities and Text-To-Speech (TTS) engines. Further, interface 404 may serve as an entry point to one or more voice portals. Such a voice portal may include software and hardware for receiving and processing instructions from a user via voice. The voice portal may include, for example, a voice recognition function and an associated application server. The voice recognition function may receive and interpret dictation, or recognize spoken commands. The application server may take, for example, the output from the voice recognition function, convert it to a format suitable for other systems, and forward the information to those systems.

Consistent with embodiments of the present invention, interface 404 may receive natural language queries (e.g., word, phrases or sentences) from a caller and forward the queries to semantic analyzer 406.

Semantic analyzer 406 may transform natural language queries into semantic tokens. Semantic tokens may include additional information, such as language identifiers, to help provide context or resolve meaning. Semantic analyzer 406 may be implemented by one or more software, hardware, and/or firmware components. Semantic analyzer 406 may include one or more logical components, processes, algorithms, systems, applications, and/or networks. Semantic analyzer 406 may include stemming logic, combinatorial intelligence, and/or logic for combining different tokenizers for different languages. In one configuration, semantic analyzer 406 may receive an ASCII string and output a list of words. Semantic analyzer 406 may transmit generated tokens to MMDS 408 via standard machine-readable formats, such as the eXtensible Markup Language (XML).

MMDS 408 may be configured to retrieve information using tokens received from semantic analyzer 406. MMDS 408 may be implemented by one or more software, hardware, and/or firmware components. MMDS 408 may include one or more logical components, processes, algorithms, systems, applications, and/or networks. In one configuration, MMDS 408 may include an API, a searching framework, one or more applications, and one or more search engines.

MMDS 408 may include an API, which facilitates requests to one or more operating systems and/or applications included in or coupled to MMDS 408. For example, the API may facilitate interaction between MMDS 408 and one or more structured data archives (e.g., knowledge base).

In certain embodiments, MMDS 408 may be configured to maintain a searchable data index, including metadata, master data, metadata descriptions, and/or system element descriptions. For example, the data index may include readable field names (e.g., textual) for metadata (e.g., table names and column headers), master data (e.g., individual field values), and metadata descriptions. The data index may be implemented via one or more hardware, software, and/or firmware components. In one implementation, a searching framework within MMDS 408 may initialize the data index, perform delta indexing, collect metadata, collect master data, and administer indexing. Such a searching framework may be included in one or more business intelligence applications (e.g., helpdesk, chatbots, voice interactive components, etc.).

In certain configurations, MMDS 408 may include or be coupled to a low level semantic analyzer, which may be embodied by one or more software, hardware, and/or firmware components. The semantic analyzer may include components for receiving tokens from semantic analyzer 406 and identifying relevant synonyms, hypernyms, etc. In one embodiment, the semantic analyzer may include and/or be coupled to a table of synonyms, hypernyms, etc. The semantic analyzer may include components for adding such synonyms as supplements to the tokens.

Consistent with embodiments of the present invention, MMDS 408 may leverage various components and searching techniques/algorithms to search the data index using tokens received by semantic analyzer 406. MMDS 408 may leverage one or more search engines that employ partial/fuzzy matching processes and/or one or more Boolean, federated, or attribute searching components. Although, one skilled in the art will appreciate other approaches to identify these similar elements may be used or contemplated within the scope of the technology described herein.

In certain configurations, MMDS 408 may include and/or leverage one or more information validation processes. In one configuration, MMDS 408 may leverage one or more languages for validating XML information. MMDS 408 may include or be coupled to one or more clients that include business application subsystems.

In certain configurations, MMDS 408 may include one or more software, hardware, and/or firmware components for prioritizing information found in the data index with respect to the semantic tokens. In one example, such components may generate match scores, which represent a qualitative and/or quantitative weight or bias indicating the strength/correlation of the association between elements in the data index and the semantic tokens.

Figure 5:
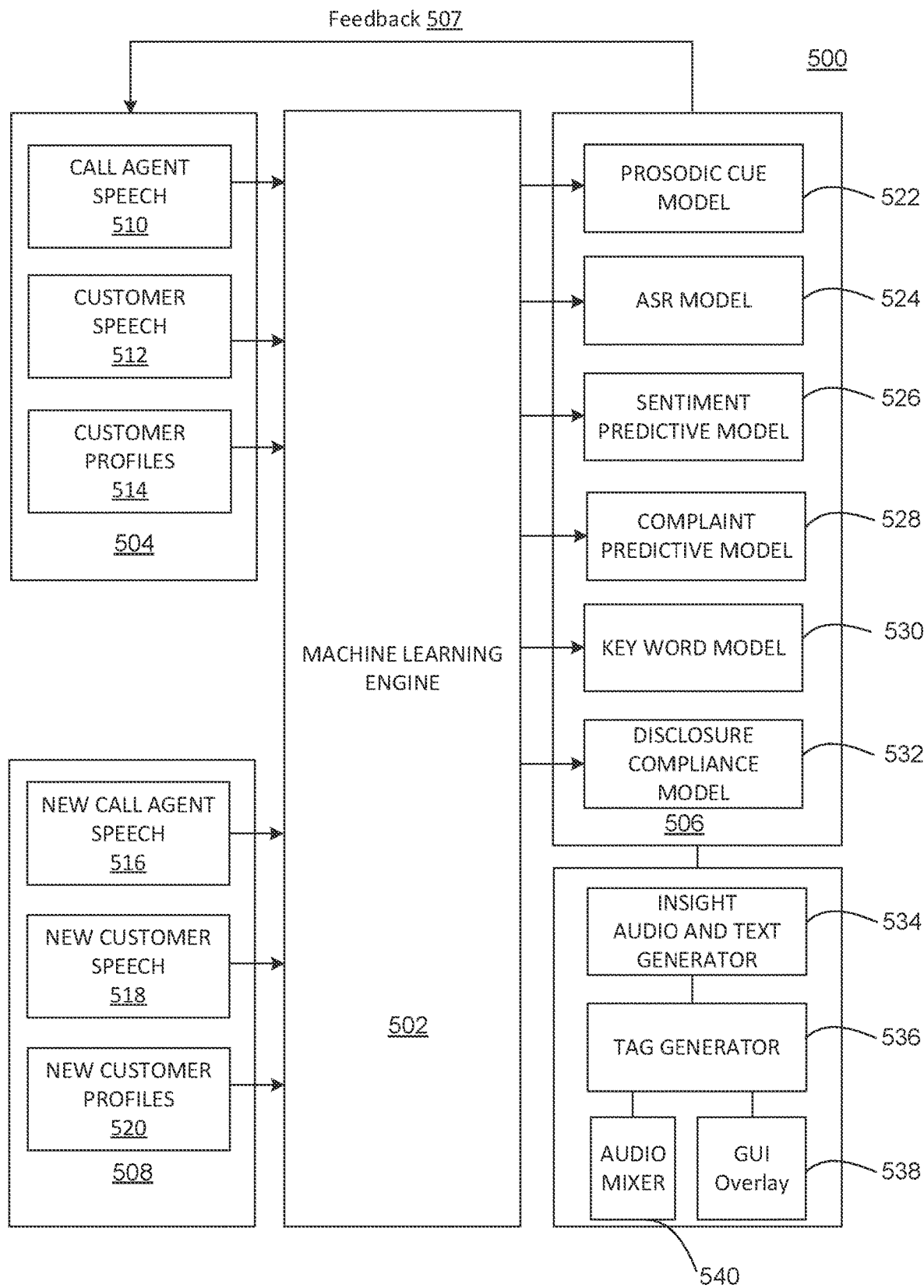
FIG. 5 is a block diagram for processing an incoming call with machine learning, according to some embodiments.

In one configuration, MMDS 408 may include one or more machine learning components to enhance searching efficacy as discussed further in association with FIG. 5. In one example, such a learning component may observe and/or log information requested by callers and may build additional and/or prioritized indexes for fast access to frequently requested data. Learning components may exclude frequently requested information from the data index, and such MMDS data may be forwarded to and/or included in interpreter 410.

MMDS 408 may output to interpreter 410 a series of Meta and/or master data technical addresses, associated field names, and any associated description fields. MMDS 408 may also output matching scores to interpreter 410.

Interpreter 410 may process and analyze results returned by MMDS 408. Interpreter 410 may be implemented by one or more software, hardware, and/or firmware components. Interpreter 410 may include one or more logical components, processes, algorithms, systems, applications, and/or networks. In one example, interpreter 410 may include an agent network, in which agents make claims by matching policy conditions against tokenized natural language queries and context information.

Consistent with embodiments of the present invention, interpreter 410 may be configured to recognize information identified by MMDS 408. For example, interpreter 410 may identify ambiguities, input deficiencies, imperfect conceptual matches, and compound commands. In certain configurations, interpreter 410 may initiate, configure, and manage user dialogs; specify and manage configurable policies; perform context awareness processes; maintain context information; personalize policies and perform context switches; and perform learning processes.

Interpreter 410 may provide one or more winning combinations of data elements to actuator 412. Interpreter 410 may filter information identified by MMDS 408 in order to extract information that is actually relevant to spoken inputs. That is, interpreter 410 may distill information identified by MMDS 408 down to information that is relevant to the words/sentences and in accordance with intent. Information provided by interpreter 410 (e.g., winning combination of elements) may include function calls, metadata, and/or master data. In certain embodiments, the winning combination of elements may be arranged in specific sequence to ensure proper actuation. Further, appropriate relationships and dependencies among and between various elements of the winning combinations may be preserved/maintained. For example, Meta and master data elements included in a winning combination may be used to populate one or more function calls included in that winning combination.

Actuator 412 may process interpreted information provided by interpreter 410. Actuator 412 may be implemented by one or more software, hardware, and/or firmware components. Actuator 412 may include one or more logical components, processes, algorithms, systems, applications, and/or networks. Actuator 412 may be configurable to interact with one or more system environments.

Consistent with embodiments of the present invention, actuator 412 may be configured to provide information to one or more users/systems (e.g., auto-speech recognizer 306 as shown in FIG. 3). In such embodiments, actuator 412 may interact with one or more information display devices.

In certain embodiments, actuator 412 may be configured to send requests to one or more devices and/or systems using, for example, various APIs. Actuator 412 may generate one or more presentations based on responses to such commands.

For clarity of explanation, interface 404, semantic analyzer 406, MMDS 408, interpreter 410, and actuator 412 are described as discrete functional elements within NLP 402. However, it should be understood that the functionality of these elements and components may overlap and/or may exist in fewer elements and components. Moreover, all or part of the functionality of these elements may co-exist or be distributed among several geographically dispersed locations.

FIG. 5 is a block diagram of a machine learning system, according to some embodiments. A machine learning system 500 may include a machine learning engine 502 of one or more servers (cloud or local) processing audio (i.e., speech) and text, such as words, phrases or sentences, to recognize relationships of words received by natural language system 400. As described in various embodiments, machine learning engine 502 may be used to recognize speech, speech cadence, pitch, pauses, volume, speech rate or stress, recognize punctuation, recognize sentiment within a customer's speech, recognize complaints, recognize trends, recognize key phrases and recognize disclosure compliance as relevant insights. These insights may be subsequently implemented as overlays to provide assistance to a call agent, to a call manager, to a training system or other ML models/systems. While described for a specific set of insights, any insight derived from a machine learning model may be substituted without departing from the scope of the technology described herein. In addition, while described in stages, the sequence may include more or less stages or be performed in a different order.

Machine learning involves computers discovering how they can perform tasks without being explicitly programmed to do so. Machine learning (ML) includes, but is not limited to, artificial intelligence, deep learning, fuzzy learning, supervised learning, unsupervised learning, etc. Machine learning algorithms build a model based on sample data, known as "training data", in order to make predictions or decisions without being explicitly programmed to do so. For supervised learning, the computer is presented with example inputs and their desired outputs and the goal is to learn a general rule that maps inputs to outputs. In another example, for unsupervised learning, no labels are given to the learning algorithm, leaving it on its own to find structure in its input. Unsupervised learning can be a goal in itself (discovering hidden patterns in data) or a means towards an end (feature learning). Machine learning engine 502 may use various classifiers to map concepts associated with a specific language structure to capture relationships between concepts and words/phrases/sentences. The classifier (discriminator) is trained to distinguish (recognize) variations. Different variations may be classified to ensure no collapse of the classifier and so that variations can be distinguished.

Machine learning may involve computers learning from data provided so that they carry out certain tasks. For more advanced tasks, it can be challenging for a human to manually create the needed algorithms. This may be especially true of teaching approaches to correctly identify speech patterns and associated emotions within varying speech structures. The discipline of machine learning therefore employs various approaches to teach computers to accomplish tasks where no fully satisfactory algorithm is available. In cases where vast numbers of potential answers exist, one approach, supervised learning, is to label some of the correct answers as valid. This may then be used as training data for the computer to improve the algorithm(s) it uses to determine correct answers. For example, to train a system for the task of word recognition, a dataset of audio/word matches may be used.

In a first training stage, training data set 504 (e.g., call agent speech 510, customer speech data 512, customer profiles 514, etc.) may be ingested to train various ML models 506. Customer profiles may not change from model to model, but each model 506 can select what parts of the profile are more important for the class value they are training to predict (e.g., weighting certain parts more/less relative to the other parts). Specific training data sets are shown for purposes of the following machine learning system processing descriptions. However, each model may select customized training data to train a machine learning model without departing from the scope of the technology described herein.

In a non-limiting example, a customer's customer profile 514 may include historical data points such as previous sentiments, emotions, feedback or trends for customer satisfaction scores, call reasons, links with other customers with similar call reasons, workflows associated with the customer, or recommendations to the agent.

Training a model means learning (determining) values for weights as well as inherent bias from labeled examples. In supervised learning, a machine learning algorithm builds a model by examining many examples and attempting to find a model that minimizes loss; this process is called empirical risk minimization. A language model assigns a probability of a next word occurring in a sequence of words. A conditional language model is a generalization of this idea: it assigns probabilities to a sequence of words given some conditioning context.

In a second stage, the training cycle continuously looks at results, measures accuracy and fine-tunes the inputs to the modeling engine (feedback loop 507) to improve capabilities of the various ML models 506.

In addition, as various ML models (algorithms) 506 are created, they are stored in a database (not shown). For example, as the training sets are processed through the machine learning engine 502, the ML models 506 may change (tuning/fine tuning) and therefore may be recorded/updated in the database.

Future new data 508 (e.g., new call agent speech 516, new customer speech 518 or new customer profiles 520) may be subsequently evaluated with the trained ML models 506. Specific new input data sets are shown for purposes of the following machine learning system processing descriptions. However, each model may select customized new input data to process using a machine learning model 506 without departing from the scope of the technology described herein.

In one case example, an ASR machine learning model 524 may be trained on, for example, hundreds/thousands of hours of call recordings with manual transcriptions, and may be implemented with actively developed open source speech recognition toolkits. The features to the model may include Mel-Frequency Cepstrum Coefficients (MFCCs), which represent the energy present at various frequency ranges, with ranges chosen to mimic human auditory response. The underlying model methodology leverages a combination of GMMHMM (Gaussian mixture modeling and hidden Markov modeling), n-gram language modeling, and deep neural networks (DNN). The model may achieve a word error rate (WER) of ~15.0%. This is equivalent to inter-transcriber discrepancy by a professional transcriber and thus represents a natural limit for the system (given that labels are produced by these various transcribers). However, lower error rates may be achieved by continuous training and fine-tuning of the model.

The prosodic cue model operates on audio (i.e., speech. Alternately, or in combination, the remaining models 506 may use an output of the ASR model 524 as they may operate at the textual level. In addition, they may be implemented with supervised, unsupervised or heuristic models (e.g., Term Frequency-Inverse Document Frequency (tf-idf)).

The prosodic cue model 522 may be trained based on machine learning engine 502 processing training data set 504. In this case, the prosodic cue model 522 is trained to recognize speech frequency changes, pitch, pauses, length of sounds, volume (e.g., loudness), speech rate, voice quality or stress placed on a specific utterance of the speech of the first participant and/or second participant in an interactive communication (e.g., call) and classify these prosodic cues as emotional insights, such as anger, frustration, sadness, happiness to name a few. For example, if a caller's voice volume increases, a first emotion classification threshold may be crossed that generates an insight of "irritation". As the caller's voice volumes continues to increase (e.g. shouting), a second emotion classification threshold may be crossed that generates an insight of "angry".

In another case example, a sentiment predictive model 526 may be trained based on machine learning engine 502 processing training data set 504 as well as prosodic cues extracted from the prosodic cue model 526. In this case, the sentiment predictive model 526 is trained to recognize sentiments within speech or a transcript of speech. For example, sentiment predictive model 526 may detect when a customer is becoming angry or dissatisfied. Acoustic features (from prosodic cue model 522) in accordance with aspect-based sentiment analysis is a more targeted approach to sentiment analysis identifying both emotion and their objects (products, services, etc.). This is particularly useful for customer calls as it helps agents identify which items need improvement to achieve higher customer satisfaction. The system performs aspect-based sentiment classification on a turn level (e.g., every time a new utterance is available). Performing this in real-time enables the system to track how sentiment changes over the course of a call. The sentiment analyzer is a classifier that may take in utterance text and provides an output label indicating an utterance's sentiment and aspect. In this context, aspect refers to the service/product that the customer shows emotion toward. For example, customers might be generally happy about being a customer of a bank, but they might complain about their interest rates. In this case, the aspect would be toward interest rates (e.g., the service/product the customer is referring to) and the sentiment would be negative. One goal may be to detect when conversation is headed in a direction containing disappointment, dissatisfaction, as recognized by emotions trending from happy to tired, giving up, frustrated or angry. By way of a non-limiting example, customer dissatisfaction may be determined by one of two ways—the detected emotion belongs to a negative category (e.g., angry) and the call's emotions have a downward trajectory (e.g., initial emotions were positive and subsequent emotions are intermediate).

The interaction below is an example where the sentiment against a certain aspect changes.

[Agent] I would be happy to help you with viewing your payment history.
[Customer] Awesome. I hope I can get the app to work.
Aspect: app
Sentiment: positive
[Agent] Once in the account summary page, please click on the account history to view previous transactions.
[Customer] This is useless. There is no way that this app can go back 6 months and show all the history at the same time.
Aspect: app
Sentiment: negative As can be seen in the interaction above, the sentiment against the app has changed over the course of the call. The sentiment predictive model's turn level analysis may also capture that the agent's instructions did not resolve the customer's issue.

This component is to not only capture sentiments for specific aspects, but also to understand a customer's emotions throughout a call. To that end, sentiments are not limited, for example, to a specific number of positive/negative sentiments: a range of emotions that affect customer satisfaction considered during classification. The example below shows a change of emotions during a call.

[Customer] I have been trying to make a payment for over an hour now and it's still stuck!
Sentiment: angry
[Agent] I apologize for the inconvenience. I will be happy to assist you with your payment.
[Customer] Oh good. Finally, I'm talking to someone who can help.
Sentiment: hopeful
[Customer] Ah, I see. There it is. That payment button seemed to be hiding on my phone screen. Now that I found it, it'll be easier.
Sentiment: happy Sentiment predictive model 526 may also include trend or feedback scoring based on a trend of accumulated sentiment scores. A sentiment score may reflect a customer's satisfaction level (gauge) and an average, over a period of time of a customer's emotions, may be predicted for each utterance. Sentiment predictive model 526 may analyze the segments to determine, based on sentiments of the call and the language choice of customer during the call, whether an emotion is being voiced. Sentiment predictive model 526 may classify a detected sentiment based on any of: emotions detected, subject matter detected, sound volume, or intensity of the call utterances. For example, based on prosodic cues from Prosodic Cue Model 522, the semantic detector may detect an agitated caller who may raise their voice, increase the speed or intensity of their speech, or use words depicting anger. Therefore, the technology described herein improves the technology associated with handling calls by, at a minimum, properly capturing caller sentiment and subsequently detected sentiment trends. Properly captured sentiment, as described herein, is one element leading to higher correlated solutions.

In one embodiment, the sentiment score may measure a customers' likelihood to recommend a product or service. A transformer-based language model uses call transcripts to predict customers' answer to the following question: "Based on your recent call experience, if a family member, friend, or colleague asked you to recommend a credit card, how likely would you be to recommend [company name]?" The response is on a scale of 1-5 and delineated as follows: "promoters" respond 5, "neutral" respond 4, "detractors" respond 3 or less. One way to calculate sentiment score is by taking the percent of "promoters" and subtracting the percent of "detractors," and this particular method of calculation is also commonly named the "Net Promoter Score." The model architecture consists of an input of tokenized word indices, each represented by an embedding vector. The input, an entire call transcript, is vectorized and then transformed via layers of "self-attention" which produce a feature-rich vector representation of the transcript. This vector representation is then passed into a classification layer, which utilizes an ordinal regression algorithm to rank the output as "detractor"<"neutral"<"promoter". The rank of "promoter" represents a predicted score greater than "detractor" and "neutral" ("neutral" predicted as greater than "detractor" but less than "promoter", etc.) A predicted sentiment score is then calculated as above with these predicted labels.

A trend may be calculated aggregating the model-predicted sentiment scores on a daily, weekly, or monthly basis to obtain sentiment scores over time. With this time-series, deviations can be determined by applying a trend detection algorithm measuring changes in the mean and/or slope. In addition, a customer-specific trend score may be calculated by tracking sentiment scores for a customer across calls. For example, the sentiment predictive model 526 may predict trend scores for all customer X's previous calls to obtain X's time-series. The system may monitor these trend scores to detect when a deviation occurs, such as a very negative call, or calculate the moving average to determine when a customer's experience drops below a threshold. Calls can be identified for further investigation of coaching opportunities and improvement to call center processes.

In another case example, a Complaint Predictive Model 528 predicts whether a historical call contains an insight of a complaint (e.g., tier 1) and can leverage this model on individual customer utterances. For a first task, machine-learning engine 502 may use the complaint predictive model 528 on the dialogue history (e.g., transcript) to classify previous complaints. Alternatively, or in addition to, for a second task, this model may classify current utterances during the call to predict whether the call up to the current time contains a complaint. For a third task, the system may predict whether a complaint is likely in the upcoming utterances.

In some embodiments, supervised training data may include calls that include known complaints. For model training, the system may use, as training data, outputs from the current sentiment predictive model 526. In a non-limiting example, the Sentiment Predictive Model 526 scores every utterance of a transcript (sentiment score). The information may include utterances with low sentiment scores that come right before utterances with high sentiment scores. Those utterances are positive examples.

Complaint predictive model 528 may also extract the customer's various reasons for calling as these reasons develop throughout the call. A call reason classifier may predict a call reason based on a historical review of the caller's reasons for calling against known call reasons of other customers. The model can leverage this prediction to determine an average number of calls with the same call reason (e.g., how many times did the customer have to call to resolve the problem vs. how many times others called to resolve a similar issue? Knowing the number of calls that a customer had to make to resolve the same issue with the same call reason will help predict the call reason of the upcoming call. In addition, if the customer could not reach a satisfactory resolution, it is likely that they will call again with the same problem. The history about the calls and the details/actions taken about the problem would help guide next agent's choice of actions to resolve the problem.

In a non-limiting example, for each customer or agent utterance, the system may pass a call reason classifier over the utterance and update the customer profile with this information. In one non-limiting example, this model may be a L1 penalized Logistic Regression classifier, trained to identify, for example, one of many classes of call reasons in a snippet of call text. These call reasons range from topics (e.g., as shown in the below call record—balance transfers, hardship-based policies and procedures (hardship) and dispute times). An example of call text and the call reason identified in this text is given below:

balance_transfer_api—"I was wondering if there was a fee or, like, an interest charge if I transfer my balance from my first credit card to my second credit card"

hardship—"Yes my husband isn't working right now. His work was closed—it's a restaurant—his work was closed because of the coronavirus. I'm wondering if I may get a break on the amount that I pay each month until he finds another job."

disputes_time_to_resolve—"I called in a while ago about a charge that I didn't make and the person, the agent told me I may call to see when the charge would be taken off my card.

As the call is happening (i.e., in real time), a complaint is detected on the current utterance. Subsequent utterances may also be labeled as complaints. As the call history or current call continues, utterances may begin to have higher sentiment scores (happier) compared to previous utterances and thus not be labeled as a complaint, indicating that the complaint may have been resolved. In the example below, the Complaint Predictive Model 528 detects a complaint during the first three utterances. The model classifies the fourth utterances as a non-complaint. Since the subsequent utterances are also non-complaints, the system may capture the first few non-complaint utterances immediately after the complaint utterances as the resolution. In one non-limiting example, the system may recognize multiple tiers of complaints (e.g., Tier 1 and Tier 2). A Tier 1 complaint may be handled at the agent level whereas a Tier 2 complaint may require an escalation to the front-line manager. One example trends analysis is shown below:

[Customer] I can't believe I have this late fee.
Tier 1 inquiry—0.7
[Agent] I apologize and I will take a look at this issue for you.
Tier 1 inquiry—0.6
[Customer] I always pay on time. It's ridiculous that I'm charged a fee when I'm one day late.
Tier 1 inquiry—0.85
[Agent] I have good news. We are able to remove the late fee for you.
Non Tier 1-0.2
[Customer] Thank you, I appreciate that. Non Tier 1-0.05
[Agent] No problem, thanks for being a loyal customer.
Non Tier 1-0.06

For a fourth task, an average amount of time until complaint is detected may be predicted based on previous call history complaint time lines. For example, the average amount of time it takes for a given customer to have a complaint during a call is computed from the call histories and that information is provided to the agent in real-time so that agent has an expectation for the rest of the call and takes appropriate actions (i.e., providing a different set of solutions).

For a fifth task, an average number of words until complaint is detected may be predicted based on previous call history complaint word counts. Similar to the amount of time detected before a complaint is reached, the average number of words until a complaint occurred in historical calls for the given customer will be calculated to aid as an insight to predict when a possible complaint is about to occur.

Once the Complaint Predictive Model 528 is trained, the system may preemptively provide insights to the agent that the customer may or is about to complain based on recognizing trends in sentiment scores.

In another case example, a key word model 530 may be trained based on machine learning engine 502 processing training data set 504. While described for key words, the discussion is equally applicable to multiple key words (e.g., key phrases). In this case, the key word model 530 is trained to recognize key words or phrases within speech or a transcript of speech. In one non-limiting example, key word extraction may be unsupervised and may utilize any known key word extraction technique, such as BERT based techniques.

Key Word Model 530 may be implemented as a text classifier to evaluate the interactive communication between a caller and a call agent to obtain one or more key words or phrases in the transcript of the call. Key phrases may provide an insight into a topic(s) within a dialogue. In addition, they may be semantically rich and easy to comprehend, as they may typically be short (e.g., 1-3 word phrases). These short phrases may be useful for determining the insight of "intent" of calls. The one or more key phrases of the text may be based at least partially on linguistic cues within the interactive communication.

In some embodiments, Key Word Model 530 utilizes a term frequency-inverse document frequency (tf-idf) approach to look at the frequencies of words or phrases on a given call. In information retrieval, tf-idf is a numerical statistic that is intended to reflect how important a word is to a document in a collection or corpus. It is often used as a weighting factor in searches of information retrieval, text mining, and user modeling. The tf-idf value increases proportionally to the number of times a word appears in the document and is offset by the number of documents in the corpus that contains the word, which helps to adjust for the fact that some words appear more frequently in general. Tf-idf can be successfully used for stop-words filtering in various subject fields, including text summarization and classification. For example, if a certain phrase is rare in most of the other calls, but more frequent in the current call, then it is selected as a key phrase for this call.

In some embodiments, the key phrases are extracted in an unsupervised manner and therefore do not become outdated, as they may be updated as new calls come in. Therefore, even when word choices differ through time, the key phrase detector (e.g., extractor) is able to keep up with the new trends (e.g., new phrasing or new subjects).

The key words or phrases are generally indicative of call reasons and may have a correlation with how much effort the customer needs to make to resolve their issue. For example, the customers calling about their cards not working generally end up requesting a new card. Therefore, classifiers would benefit from these key phrases as features. In addition, offering a new card with fast shipping without expecting the customer to inquire about it can result in low effort from the customer's perspective, which may be useful information for predicting an effort level in the call.

In another case example, the system may train a disclosure predictive model 532 so that it may provide an insight as to whether a disclosure is actually being read or is likely in the upcoming utterances. In some embodiments, this is framed as a multi-class classification task. The training data may include calls that contain disclosures. For model training, the system may use the current predictive model to score every utterance of a transcript to produce a disclosure score. The output of the model may be from a static list of classes: the types of disclosures in the system plus one class for no disclosure needed. Once the model is trained, the system may preemptively warn the agent that no disclosure is currently being read. This model may be, for example, an L1 penalized Logistic Regression classifier, trained to identify, for example, one of X disclosures in a snippet of call text. However, any known or future classifier may be substituted without departing from the scope of the technology described herein.

Disclosure compliance predictive model 532 may extract from the call agent's speech utterances to predict whether a disclosure is correctly read during a current call. In one example embodiment, a custom training set may include a large set of N previous user interactions (call data, call agent speech 510 and disclosures). Machine learning engine 502 processes this training set to recognize call agent disclosure interactions that previously resulted in successful outcomes (no errors) based on specific call agent phrasing. Once the disclosure compliance predictive model 532 has been trained to recognize patterns of behavior that resulted in successful behavior, it may take as an input any future behavior and correlate to determine a higher likelihood of successful outcome. For example, the model may provide real-time similar phrasing/actions/options classified by Key Word Model 530 as suggestions to assist call agents to complete the disclosure while they are in a current call session. Key Word Model 530 may extract from the call agent's the specific speech utterances words or phrases read incorrectly or not at all (i.e., missing) during a current call and generate one or more corrections to be organized and communicated to the call agent. For example, the phrasing may predict phrasing by including the correct words and may add supportive text, such as introductory phrasing or instructional phrasing. In some embodiments, the supportive text may include an introduction clause that interrupts the current call and indicates that a disclosure needs to be updated or corrected. In some embodiments, the phrasing will be a complete sentence from the disclosure or the entire disclosure. The predictive phrasing model predicts, based on training from previously successful similar disclosure reading corrections, phrasing and supportive text that will complete the disclosure reading such that is it compliant with, for example, regulatory requirements.

Insight Audio and Text Generator 534 converts insights derived by the machine learning models 506 to audio and textual descriptions capturing the insight. In some embodiments, the insight descriptions may be stored a predetermined phrases and selected based on an output of a machine learning model classifier. Alternatively, descriptions may be generated on the fly based on key words or phrases located within a section of a call record where the insight occurred. In a first non-limiting example, an audio insight reflecting a negative emotion of "angry" may be converted to audio or text words of "the customer is becoming angry". In a second non-limiting example, a key word insight reflecting a specific reason for a call may be converted to "the caller has called to report a stolen credit card".

In some embodiments, insights will be derived at or near the end of a respective audio or text section where the insight occurs. Therefore, tag generator 536 tags a call transcript, where the insight occurred, at a specific time or place in the call record. In one non-limiting example, the tag is a time stamp. However, for a better future review, the tag may be added to any point in the audio or transcript that will facilitate a quicker understanding of the call. In a non-limiting example, the insights may be tagged right before the words that generate the insight, at the end of these words, anywhere in-between or at the beginning or end of a complete call record.

Audio mixer 540 overlays a voice reading of the audio descriptions of a respective at a point in the call record noted by a corresponding tag. In an exemplary embodiment, the voice reading is a "whisper" version of the insight description.

GUI overlay 538 overlays a graphic with text of the insight description. For example, if the disclosure compliance model 532 detects that the call agent has successfully read a disclosure, a graphic may be overlaid at the tagged disclosure reading completion point. In a non-limiting example, the graphic may read, "financing disclosure successfully read". If the disclosure compliance model 532 detects that the call agent has not yet read a disclosure, it may overlay a reminder graphic, such as "you need to read the financing disclosure to the customer".

While shown as part of the machine learning system, the process of generating audio or textual insight descriptions, tagging, and overlaying (audio or text) may be performed in the natural language processor 402. Alternately, or in combination, this processing may be performed in one or more computing devices separate from the machine learning model system 500 or natural language processor 402.

Figure 6:
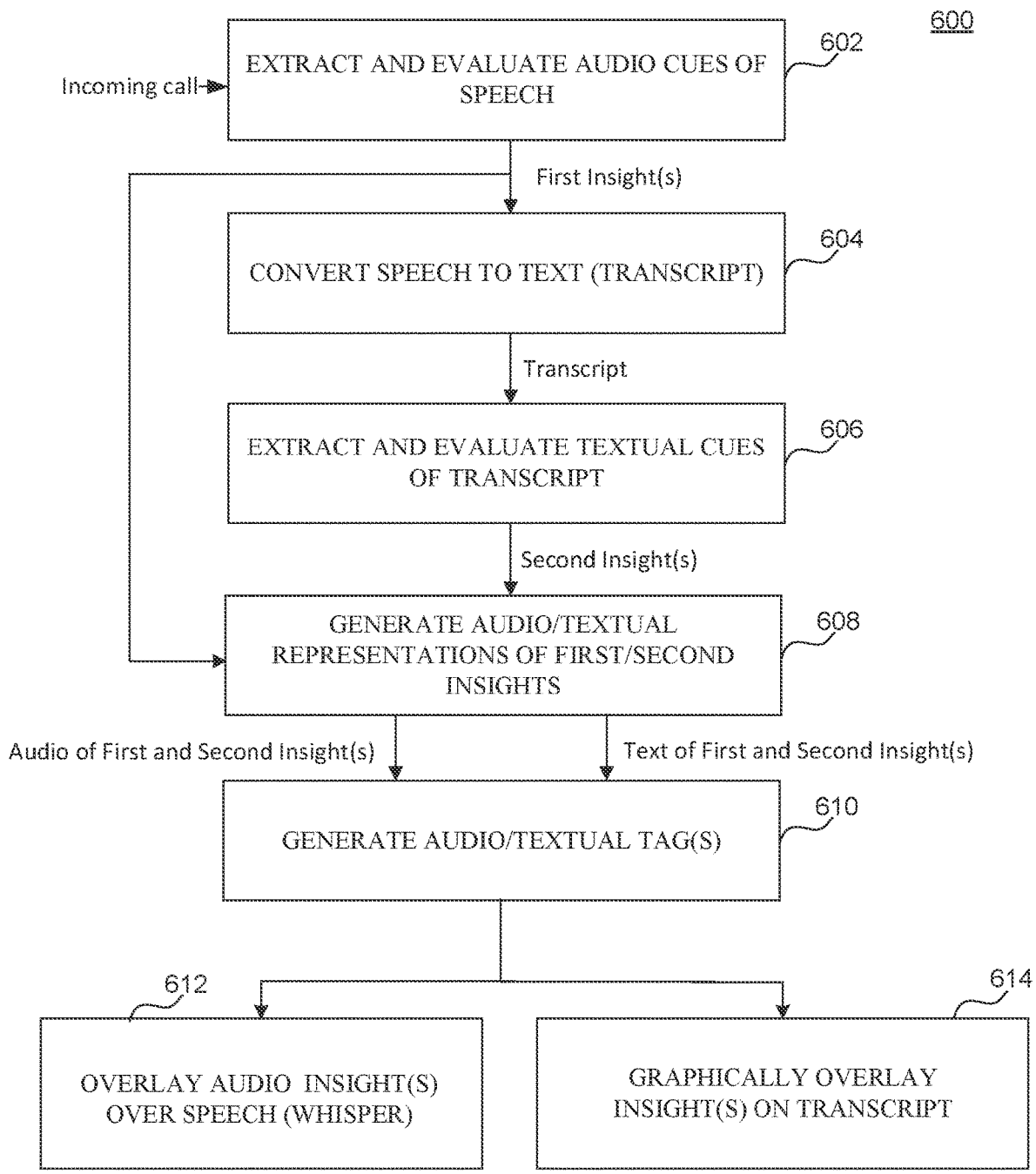
FIG. 6 is a flow diagram for extracting audio and textual insights from an interactive communication, according to some embodiments.

FIG. 6 is a flow diagram for real-time call processing, according to some embodiments. In 602, an audio-based classifier (e.g., prosodic cue model 522) may be configured to extract and evaluate speech of an interactive communication (incoming call) between a first participant and a second participant to infer one or more changes to emotion of the speech of the first participant. The one or more changes to emotion of the speech may be based at least on extracted prosodic cues found within the interactive communication. These prosodic cues may comprise any of frequency changes, pitch, pauses, length of sounds, volume (e.g., loudness), speech rate, voice quality or stress placed on a specific utterance of the speech of the first participant and/or second participant. Subsequently, these cues may be classified as insights found within the audio (i.e., speech). The system may perform aspect-based classification on a turn level (e.g., every time a new utterance is available). Performing this in real-time enables the system to track how insights change (e.g., trends) over the course of a call record.

In 604, the system will convert the speech to text using, for example, the automatic speech recognizer machine learning model 422. In one embodiment, the text string may be converted from text or character format into a numerical format. In one embodiment, the conversion may be performed by converting each word of the text string into one or more tokens by a semantic analyzer 406 (see FIG. 4). The one or more tokens refer to a sequence of real values that represent and map to each word of the text string. The one or more tokens allow each word of the text string to be numerically quantified so that computations may be performed on them, with the ultimate goal being to generate one or more contextualized vectors. The contextualized vectors refer to vectors that encode the contextualized meaning (e.g., contextualized word embeddings) of each of the tokens into a vector representation. The contextualized vectors are generated through the processes and methods used in language models such as the BERT (Bidirectional Encoder Representations from Transformers) and RoBERTa (Robustly Optimized BERT Pretraining Approach) language models.

In 606, a word-based classifier, for example, Key Word Model 530 is configured to classify the incoming call based on a text classifier. The word-based classifier is configured to evaluate the transcript of an interactive communication between a first participant and a second participant to extract one or more key words or phrases of the speech of the first participant. The one or more key phrases of the speech may be based at least partially on linguistic cues within the interactive communication. In one non-limiting example, key phrase extraction may be unsupervised and may utilize any approach known key phrase extraction technique, such as BERT based techniques.

In 608, call center system 100 converts the extracted audio and textual insights to textual audio and textual descriptions. For example, the machine learning engine 502 classifies a sentiment of customer speech and, if a negative sentiment is detected, identifies a negative emotion (anger, confusion, discontent, or dissatisfaction) present. The system may then extract services, features, and topics mentioned by customers and may identify one or more categories of sentiment attributed to each of these. The system may also classify emotions based on subject matter detected, sound volume or intensity of the call utterances. For example, using extracted prosodic cues from Prosodic Cue Model 522, an agitated caller may raise their voice, increase the speed or intensity of their speech or use words depicting anger. Using the identified insights, the system generates words that describe these insights and saves then as audio (e.g., spoken words) or as text.

In 610, the call center system 100 tags points (e.g., time or position) along the audio or textual version of the call where an insight occurs. One skilled in the art would recognize that insights will be derived at or near the end of a respective audio or text section that generates the insight. However, for a better future review, the tag may be added to any point in the audio or transcript that will facilitate a quicker understanding of the call. In a non-limiting example, the insights may be tagged right before the words that generate the insight, at the end of these words, anywhere in-between or at the beginning or end of a complete call record. When the reviewer of the call is attempting a quick read to understand the situation, they only need to focus on the insights. For example, it is possible to understand quickly that the customer is having a problem with their credit card based on a corresponding insight. In one embodiment, the reviewer could simply review each of the tagged insights to understand the entire call.

In 612, an audio recording (e.g., spoken words) of a call includes audio overlays of insights tagged relative to when they occur in the call. In a non-limiting example, audio overlays may include audio overlays (e.g., whisper voice overlay) with descriptions of the insight. These audio overlays may be provided to call agents or call center managers for quick listening, either during a call, for a next call by a same caller to quickly get up to speed on the last interaction, or for training purposes. For example, it is much easier to review the content of a call with the insights overlaid.

In 614, a transcript of a call is implemented with visualization of insights tagged relative to when they occur in the transcript. In a non-limiting example, visualization may include graphical overlays with descriptions of the insight. These visualizations may be provided to call agents or call center managers for quick reading, during a call, for a next call by a same caller to quickly get up to speed on the last interaction, or for training purposes. For example, it is much easier to browse through the content of a transcription with the insights visualized.

One skilled in the art would recognize that insights will be derived at or near the end of a respective audio or text section where the insight occurs. However, for a better future review, the tag may be added to any point in the audio or transcript that will facilitate a quicker understanding of the call. In a non-limiting example, the insights may be tagged right before the words that generate the insight, at the end of these words, anywhere in-between, or at the beginning or end of a complete call record. When the reviewer of the call is attempting a quick read to understand the situation, they only need to focus on the insights. For example, it is possible to understand quickly that the customer is having a problem with their credit card based on a corresponding insight. In one embodiment, the reviewer could simply review each of the tagged insights to understand the entire call.

FIG. 7 is an example of tagging insights within an interactive communication, according to some embodiments.

As previously described in FIG. 2, an audio record includes both audio and textually derived insights overlaid on the call record. A textual equivalent version of an example conversation 700 (e.g., transcript of incoming call) is shown in FIG. 7. The transcript may include a varying level of detail without departing from the scope of the descriptions provided herein. For example, in some embodiments, the transcript may include all of the words spoken by the customer (caller) and the call agent (agent). In some embodiments, the transcript may include fewer than all of the words spoken by the customer (caller) and the call agent (agent). In some embodiments, the transcript may include only key phrases spoken by the customer (caller) and the call agent (agent). Other transcript variations are contemplated within the scope of the technology described herein. In each level of detail, one or more extracted insight descriptions 704, 710 and 712 are graphically displayed at tag points for a quick reading.

At time 00:00:06, the machine learning system infers a textual insight that the call agent has successfully read a greeting. This insight may be determined, for example, by a key word model 530 classifying words from the transcript reaching a threshold of matching known keywords from known initial greetings. For example, the system matches at least 70% of known greeting key words. A description of this insight 704 is tagged as Tag 1 at or near the words 706 "thank you so much for calling Capital One" used in inferring the insight. The insight description reads as "greeting: success".

At time 00:00:18, the machine learning system infers a textual insight of a known reason for calling. This insight may be determined, for example, by a key word model classifying words from the transcript reaching a threshold of matching known keywords from known reasons for calling. For example, the system matches at least 70% of known reasons for calling. A description of this insight 710 is tagged as Tag 2 at or near the words 708 "I haven't been able to find my card" used in inferring the insight. The insight description reads as "call type: lost card"

At the end of time 00:00:18, the machine learning system infers an audio insight of an emotion. This insight may be determined, for example, by a prosodic cue model 522 classifying audio cues from the audio of the transcript reaching a threshold of known prosodic cues (e.g., raised voice). A description of this insight 712 is tagged as Tag 3 at or near the words 714 "I have no idea where my credit card is" used in inferring the insight. The insight description reads as "Emotion: caller getting frustrated"

In the above example, the original transcript 700 has been modified to include insights 704 and 710 derived from textual cues 706 and 708, respectively, located within the original transcript. At the same time, the original transcript has been modified to include insight 712 derived from audio cues (e.g., pitch) associated with words 714 found within an original audio 202 recording of the transcript 700.

While tags have been shown using known graphic techniques such as text within a box, any other known visualization technique may be implemented without departing from the scope of the technology disclosed herein. In one non-limiting example, anger may be reflected with a corresponding known emoji.

The extracted insights presented in this disclosure are intended to be used by at least two different downstream users (agent/managers and ML models). One benefit of visualizing the insights to call agents/managers is to facilitate their work (e.g., regulatory compliance, training opportunities, etc.) and save time. Another benefit is utilizing these insights as features for downstream ML models to increase a model's effectiveness in understanding customer behavior.

Figure 8:
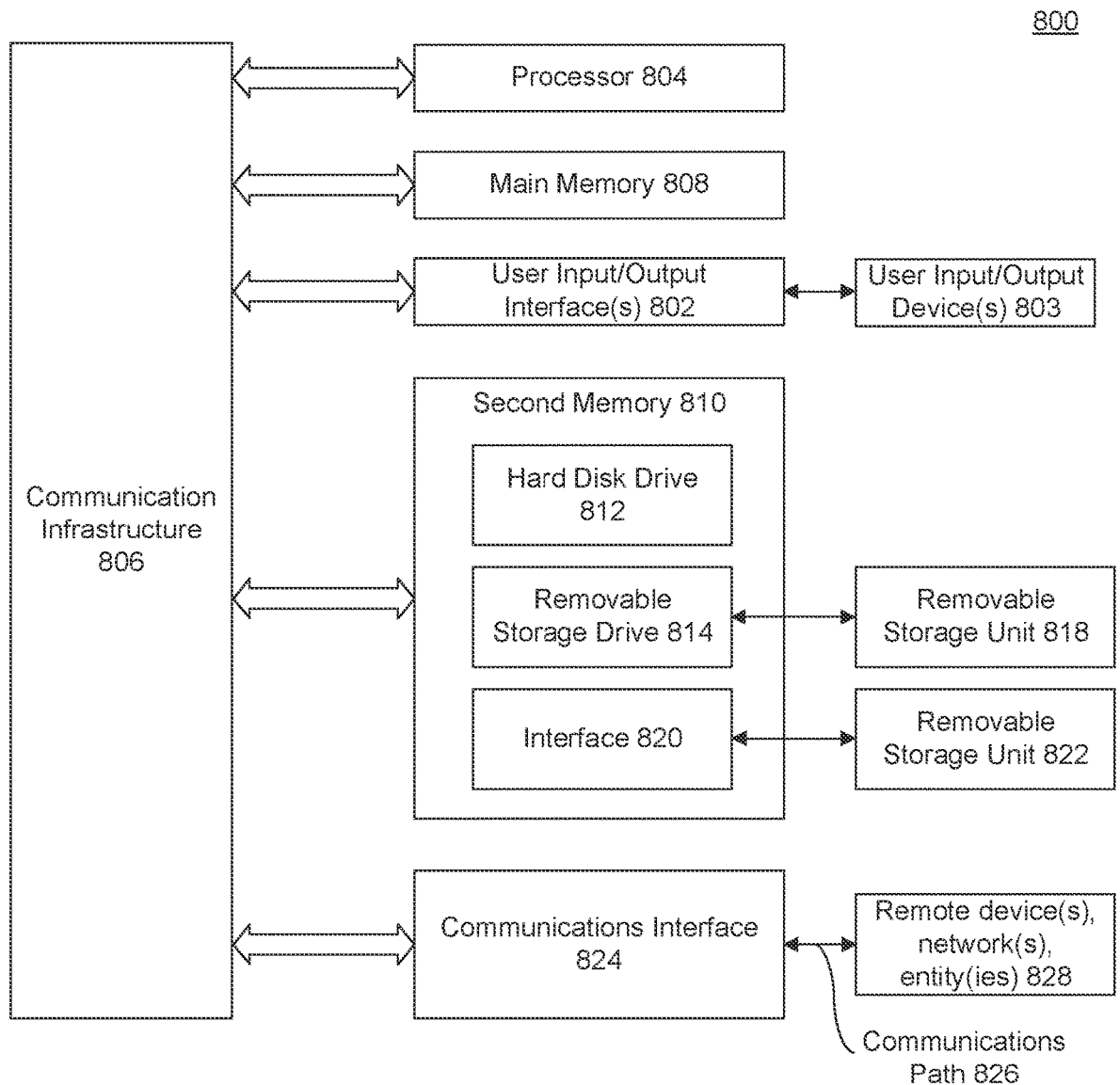
FIG. 8 is an example computer system useful for implementing various embodiments.

Various embodiments can be implemented, for example, using one or more computer systems, such as computer system 800 shown in FIG. 8. Computer system 800 can be any computer capable of performing the functions described herein. Computer system 800 can be any well-known computer capable of performing the functions described herein.

Computer system 800 includes one or more processors (also called central processing units, or CPUs), such as a processor 804. Processor 804 is connected to a communication infrastructure or bus 806.

One or more processors 804 may each be a graphics-processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 also includes user input/output device(s) 803, such as monitors, keyboards, pointing devices, etc., that communicate with communication infrastructure 806 through user input/output interface(s) 802.

Computer system 800 also includes a main or primary memory 808, such as random access memory (RAM). Main memory 808 may include one or more levels of cache. Main memory 808 has stored therein control logic (e.g., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired, and/or wireless, and which may include any combination of LANs, WANs, the Internet, etc. Control logic and/or data may be transmitted to and from computer system 800 via communication path 826.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A system for augmenting an interactive communication in a natural language processing environment, the system configured to:
   convert, by a first machine learning model trained by a machine learning system, the interactive communication to a textual transcript;
   extract and evaluate, by a second machine learning model trained by the machine learning system, textual cues in the interactive communication to infer a first insight located within the textual transcript;
   generate first text corresponding to a description of the first insight;
   tag a first section within the interactive communication with the first text corresponding to the description of the first insight;
   display the first text proximate to the tagged first section of a graphic waveform of the interactive communication;
   extract and evaluate, by a third machine learning model, audio cues in the interactive communication to infer a second insight located within the interactive communication;
   generate second text corresponding to a description of the second insight;
   tag a second section within the interactive communication with the second text corresponding to the description of the second insight;
   display the second text proximate to the tagged second section of the graphic waveform of the interactive communication;
   generate a first audio instance of the first text representing the first insight;
   generate a second audio instance of the second text representing the second insight; and
   overlay the first audio instance on the tagged first section as a first whisper voice and the second audio instance on the tagged second section as a second whisper voice of the interactive communication.

2. The system of claim 1 further configured to:
   tag the first section within the textual transcript with the second text corresponding to the description of the second insight; and display a graphic with the second text proximate to the first section of the textual transcript.

3. The system of claim 1, wherein the third machine learning model comprises:
a prosodic cue model to extract and evaluate prosodic cues within the interactive communication.

4. The system of claim 3, wherein the prosodic cues comprise any of:
frequency changes, pitch, pauses, length of sounds, volume, loudness, speech rate, voice quality, or stress placed on a specific utterance of speech.

5. The system of claim 1 further configured to:
display a graphic of the first text or the second text proximate to a selected section of the textual transcript.

6. The system of claim 1 further configured to:
superimpose the first audio instance or the second audio instance proximate to a selected section of the interactive communication.

7. The system of claim 1, wherein the second machine learning model comprises any of:
a sentiment predictive model to extract and evaluate semantic cues within the textual transcript;
a key word model to extract and evaluate key words within the textual transcript;
a complaint predictive model to extract and evaluate semantic and key words within the textual transcript; or
a disclosure compliance predictive model to extract and evaluate disclosure key words within the textual transcript.

8. A computer-implemented method for processing a call in a natural language environment, comprising:
converting, by a first machine learning model trained by a machine learning system, an interactive communication to a textual transcript;
extracting and evaluating, by a second machine learning model trained by the machine learning system, textual cues in the interactive communication to infer a first insight located within the textual transcript;
generating first text corresponding to a description of the first insight;
tagging a first section within the interactive communication with the first text;
displaying the first text proximate to the tagged first section of a graphic waveform of the interactive communication;
extracting and evaluating, by a third machine learning model trained by the machine learning system, audio cues in the interactive communication to infer a second insight located within the interactive communication;
generating second text corresponding to a description of the second insight;
tagging a second section within the interactive communication with the second text corresponding to the description of the second insight;
displaying the second text proximate to the tagged second section of the graphic waveform of the interactive communication;
generating a first audio instance of the first text representing the first insight;
generating a second audio instance of the second text representing the second insight; and
overlaying the first audio instance proximate to the tagged first section as a first whisper voice and the second audio instance proximate to a tagged second section as a second whisper voice of the interactive communication.

9. The computer-implemented method of claim 8, wherein the third machine learning model comprises a prosodic cue model to extract and evaluate prosodic cues within the interactive communication.

10. The computer-implemented method of claim 8 further comprising
displaying a graphic with the second text proximate to the second section of the textual transcript.

11. The computer-implemented method of claim 8 wherein the second machine learning model comprises any of:
a sentiment predictive model to extract and evaluate semantic cues within the textual transcript;
a key word model to extract and evaluate key words within the textual transcript;
a complaint predictive model to extract and evaluate semantic and key words within the textual transcript; or
a disclosure compliance predictive model to extract and evaluate disclosure key words within the textual transcript.

12. A non-transitory computer-readable medium having instructions stored thereon that, when executed by at least one computing device, cause the at least one computing device to perform natural language operations comprising:
converting, by a first machine learning model trained by a machine learning system, an interactive communication to a textual transcript;
extracting and evaluating, by a second machine learning model trained by the machine learning system, textual cues in the interactive communication to infer a first insight located within the textual transcript;
generating first text corresponding to a description of the first insight;
tagging a first section within the interactive communication with the first text;
displaying the first text proximate to the tagged first section of a graphic waveform of the interactive communication;
extracting and evaluating, by a third machine learning model trained by the machine learning system, audio cues in the interactive communication to infer a second insight located within the interactive communication;
generating second text corresponding to a description of the second insight;
tagging a second section within the interactive communication with the second text; and
displaying the second text proximate to the tagged second section of the graphic of the waveform of the interactive communication;
generating a first audio instance of the first text representing the first insight;
generating a second audio instance of the second text representing the second insight; and
overlaying the first audio instance proximate to the tagged first section as a first whisper voice and the second audio instance proximate to the tagged second section as a second whisper voice of the interactive communication.

* * * * *